United States Patent [19]

Hwang

[11] Patent Number: 5,760,680
[45] Date of Patent: Jun. 2, 1998

[54] VEHICLE SECURITY DEVICE

[76] Inventor: Shih Ming Hwang, 1F., 10, Lane 31, Chung Teh St., Taipei, Taiwan

[21] Appl. No.: 557,640

[22] Filed: Nov. 14, 1995

Related U.S. Application Data

[63] Continuation-in-part of Ser. No. 274,066, Jul. 12, 1994, abandoned.

[51] Int. Cl.$^6$ ............................................. B60R 25/10
[52] U.S. Cl. ..................... 340/426; 340/428; 340/430; 180/287; 307/10.2; 307/10.6
[58] Field of Search ...................... 340/426, 428, 340/429, 430; 307/10.2, 10.3, 10.4, 10.5, 10.6; 180/287

[56] References Cited

U.S. PATENT DOCUMENTS

| | | | |
|---|---|---|---|
| 3,740,713 | 6/1973 | Teich | 340/430 |
| 4,159,466 | 6/1979 | Mengel | 340/430 |
| 4,479,110 | 10/1984 | Cipri | 340/430 |
| 5,243,322 | 9/1993 | Thompson et al. | 340/429 |
| 5,412,371 | 5/1995 | Kaplan | 340/430 |

*Primary Examiner*—Jeffery Hofsass
*Assistant Examiner*—Daniel J. Wu
*Attorney, Agent, or Firm*—Pro-Techtor International

[57] ABSTRACT

A vehicle security device of the present invention comprising of a remote control, a receiver/decoder section, a CPU, and an amplifying section. It has been designed to arm in two ways—by remote control, and by timer. By pressing the button #1 of the remote control, the vehicle security device will be armed. The vehicle security device has two separate counters—the 10 minute counter, and the 30 second counter. No matter doors are close or open, the 10 minute counter will start counting after turning off ignition and will continue counting even if a door is opened while the 30 second counter will only start counting if any door of the car is opened and closed (provided all the remaining doors are close) but will stop counting if any door of the car is opened. The vehicle security device will arm itself if any of the two counters finished counting (whichever finished first). However, if the ignition is turned on during countdown, the car can be started and both counters will stop counting. The vehicle security device can only be disabled by pressing button #1 of the transmitter.

3 Claims, 14 Drawing Sheets

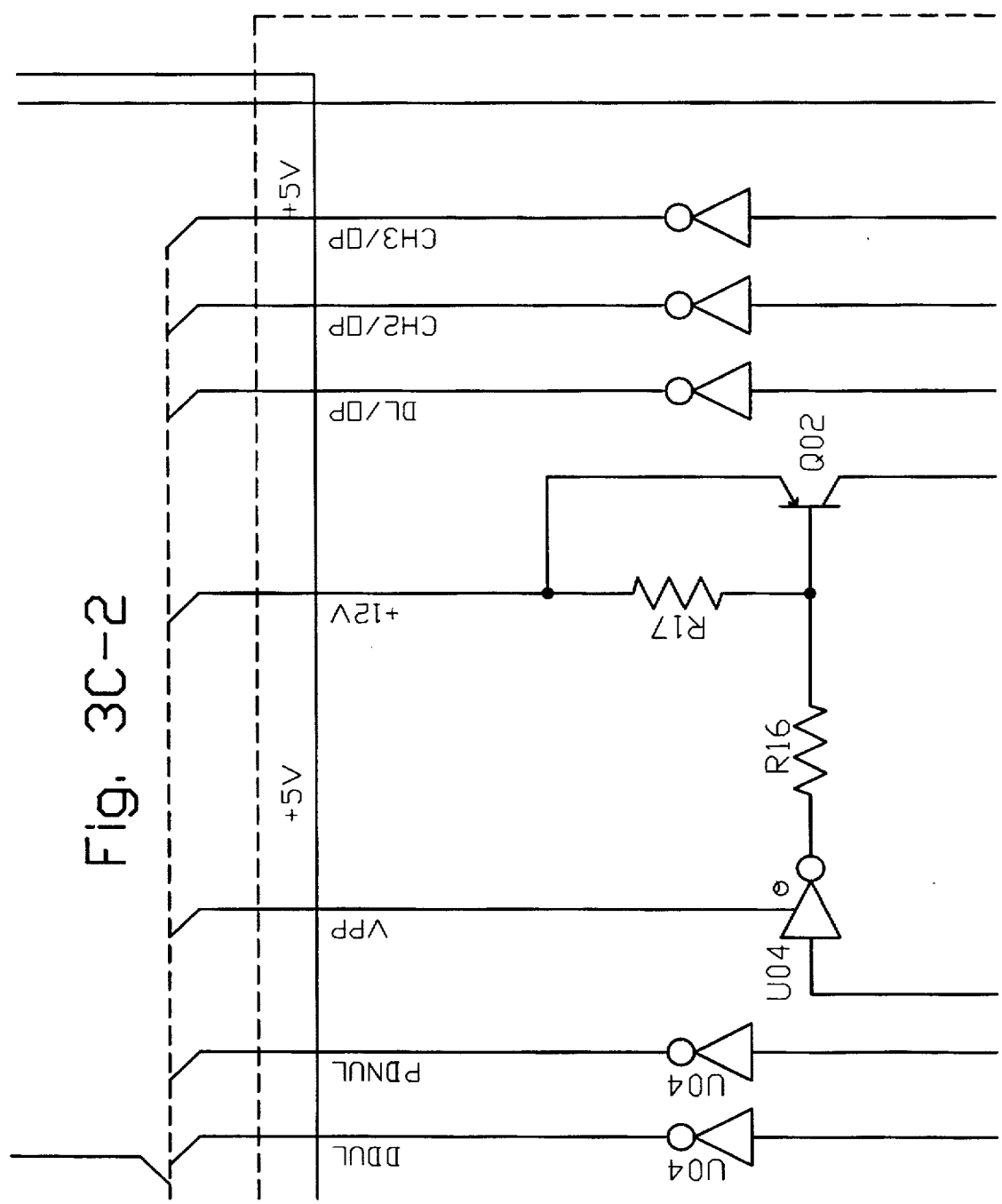

5,760,680

VEHICLE SECURITY DEVICE

This is a continuation-in-part application U.S. Ser. No. 08/274,066 filed Jul. 12, 1994, now is abandoned.

BACKGROUND OF THE INVENTION.

The present invention relates to a vehicle security device, and particularly to a vehicle security device used in a jeep or a convertible car in which door lock cannot achieve anti-burglar effect.

A conventional vehicle security device is used to detect if the car door is illegally opened or if the door glass is broken. It is also used to inform the owner of the detected status and to disable the engine if the car is illegally intruded. However, such security device is not applicable to some types of cars which have no roof, such as a jeep or a convertible car. In these types of cars, at most a steering wheel lock or a gear lever lock is equipped to prevent the car from being stolen. Accordingly, no alarming sound is emitted to scare the thieves or warn the owner. Therefore, although the convertible car is more and more popular nowadays, no effective vehicle security device is developed for such types of cars.

SUMMARY OF THE INVENTION

It is a primary object of the present invention to provide a useful vehicle security device which is able to be either externally controlled to arm/disarm its alarm device, or to automatically internally automatically controlled to arm its alarm device. In case the owner forgets to set up the alarm device, the device automatically disables the engine and arm the alarm device after a presetted time period, in order to prevent the car from being stolen.

It is a further object of the present invention to provide the above vehicle security device in which when the engine is disabled, it is impossible to start the engine unless a remote control is used to release the engine from the disabling condition.

Therefore, it is unnecessary to detect if any door of the vehicle is opened for achieving the anti-burglar effect. Accordingly, the present invention is adapted to be used for a regular vehicle as well as a particular vehicle such as a roofless or convertible car.

The present invention can be best understood through the following description and accompanying drawing, wherein:

DETAILED DESCRIPTION OF THE PREFERRED EMBODIMENT

Figure 1:
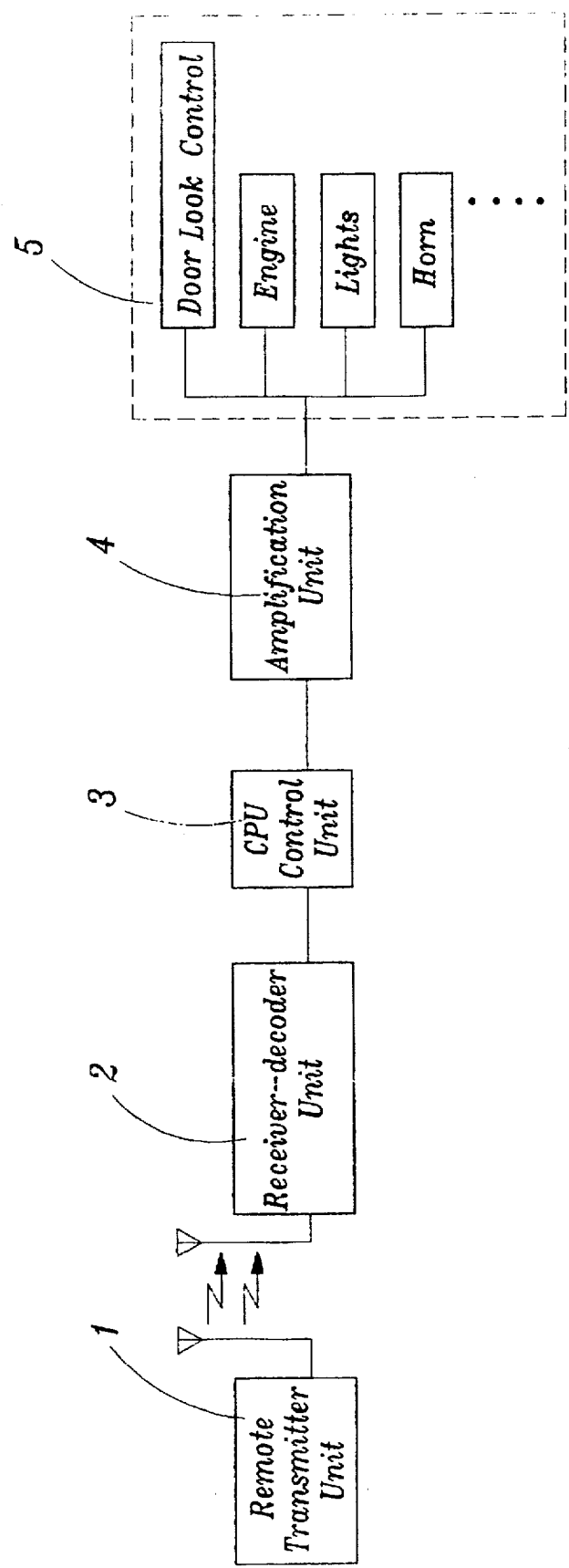
FIG. 1 is a block diagram of the present invention.

Please refer to FIG. 1. The present invention includes: a remote control unit (1) for transmitting a control signal to remotely turn on/off the alarm device of the vehicle security system; a receiver/decoder (2) section for signal received from the remote control unit. A Central Processing Unit (3), in response to the decoded and processed control signal and detected status, for controlling the operations of the present invention, such as disabling the engine by generating an arming signal as a result of processing the control signal, flashing car parking light, emitting sound, and etc.; and an amplifier section (4) used to amplify control and input signals. The signal output from the amplifier section (4) is used to control functions (5) of the vehicle.

Figure 2A:
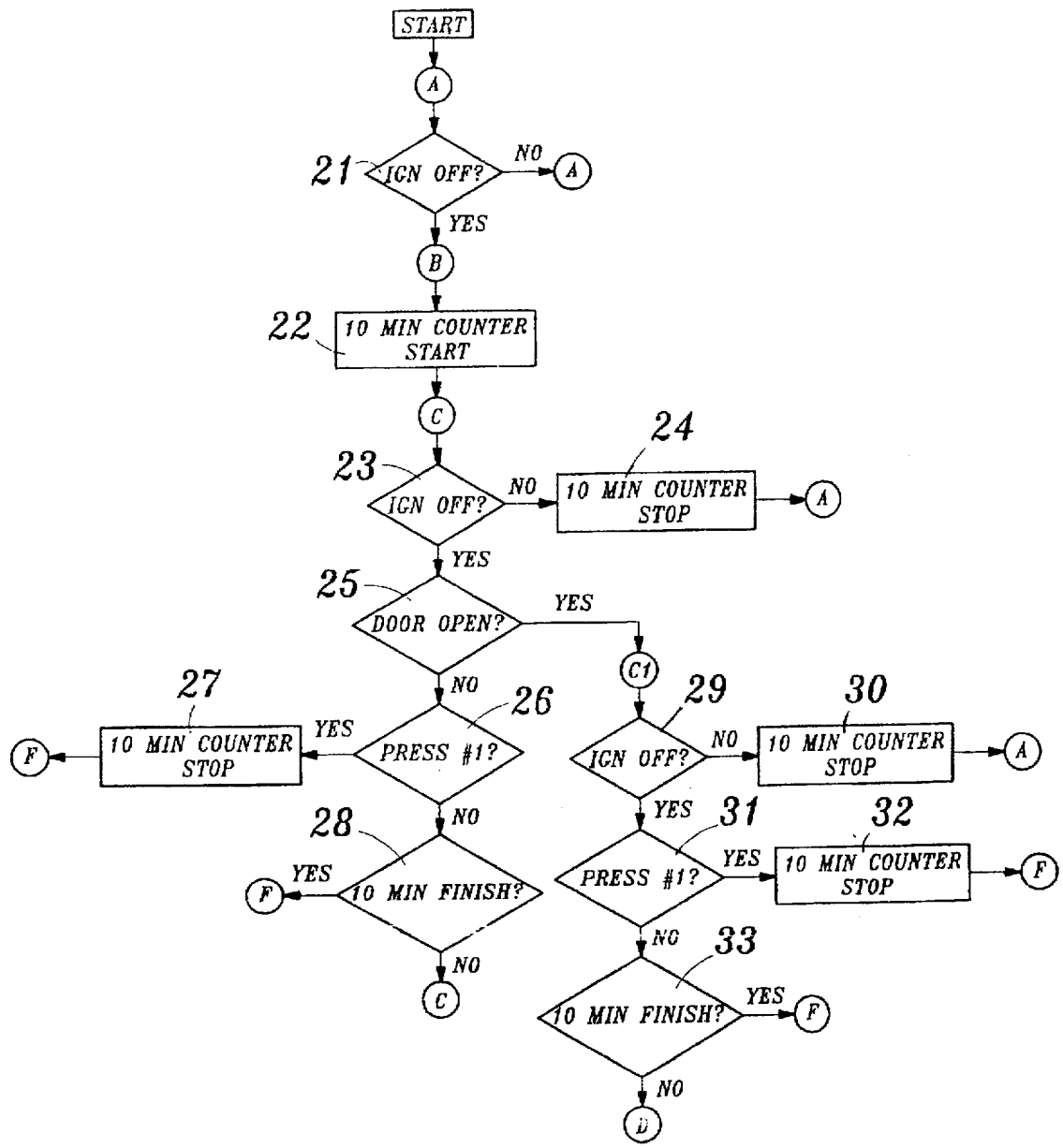
FIG. 2A, 2B, and 2C are the operation flow chart of the present invention.
Figure 2B:
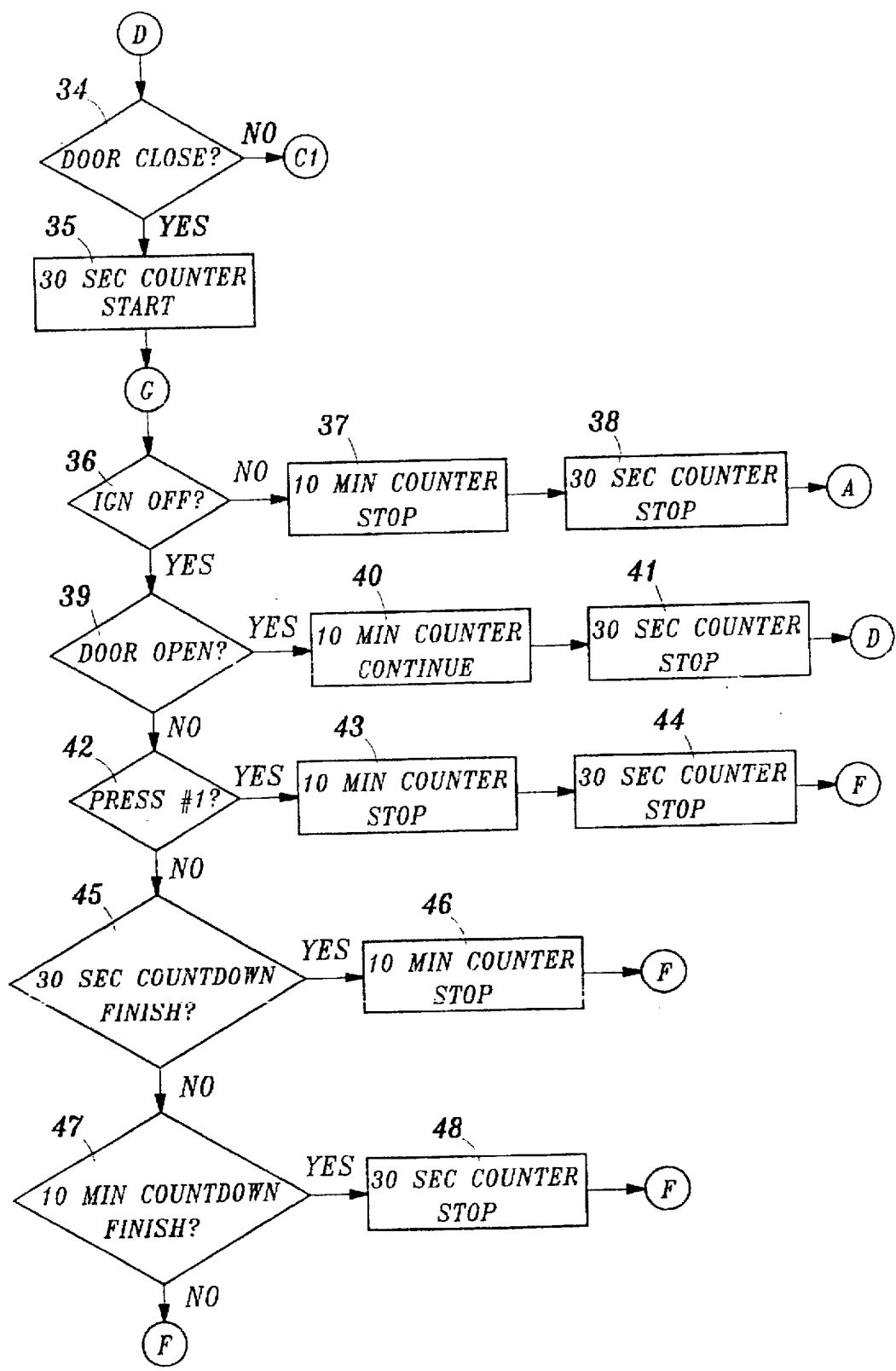
Figure 2C:
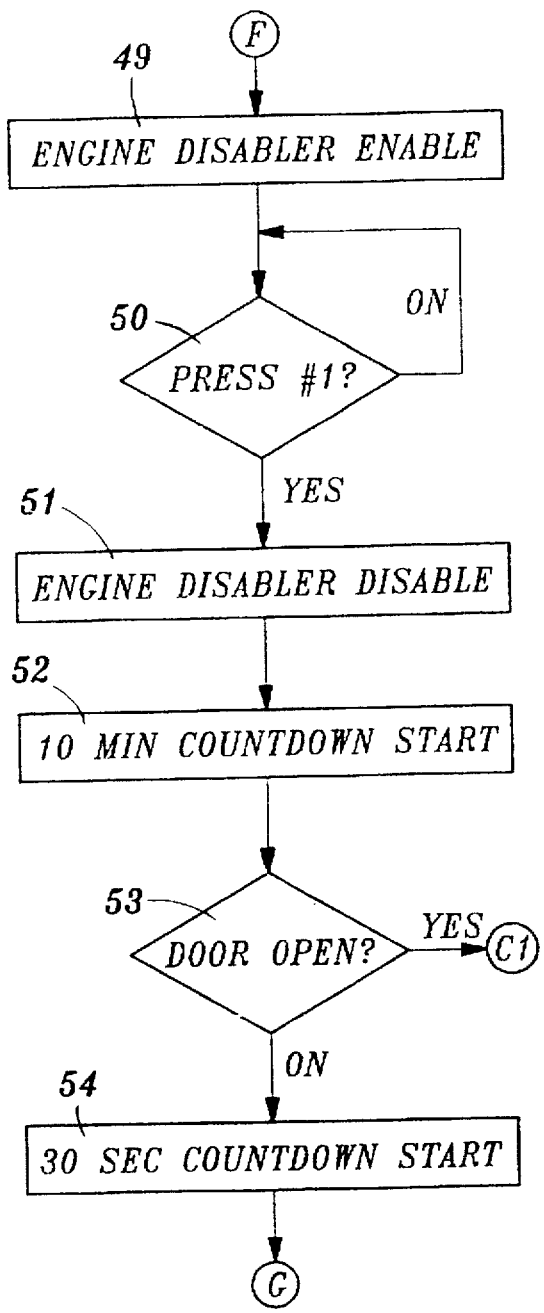

Please refer to FIG. 2A, 2B, 2C. Under initial conditions the vehicle security device is disarmed and the ignition is on. If the ignition is turned off (21), the 10 minute counter will start counting (22) and the ignition will be monitored by the CPU (23). If the ignition is turned on again, the 10 minute counter will stop counting (24) and the procedure will go back to step (21). If the ignition remains off, the doors will be checked to see if it is open or close (25).

If all doors are close, the CPU will monitor if there is a signal received by pressing button #1 of the remote control (26) or if the 10 minute counter finishes counting (28). If button #1 of the remote control is pressed, the 10 minute counter will stop counting (27) and the engine disabler will be enabled (49). The 10 minute counter will generate an arming signal when finishing counting 10 minutes, and the engine disabler will be enabled (49) in response to the arming signal. If 10 minute counting is not yet finished, the procedure will go back to step (23).

If any of the car's door is open, the CPU will monitor ignition (29), button #1 of the remote control (31), the 10 minute counter (33), and the doors of the car (34). If ignition is turned on, the 10 minute counter will stop counting (30) and the procedure will go back to step (21). If button #1 of the remote control is pressed, the 10 minute counter will stop counting (32) and the engine disabler will be enabled (49). If 10 minute counter finished counting, the engine disabler will be enabled (49). If any of the car's door is still left open, the procedure will go back to step (29). If all doors of the car are closed, the 30 second counter will start counting (35) and the CPU will continue to monitor ignition (36), doors (39), button #1 of the remote control (42), 30 second counter (45), and the 10 minute counter (47). If ignition is turned on (36), both the 10 minute counter (37) and the 30 second counter (38) will stop counting and the procedure will go back to step (21). If any of the car's door is again opened (39), the 30 second counter will stop counting (41) but the 10 minute counter will still continue counting (40) and the procedure will go back to step (34). If button #1 of the remote control is pressed (42), both the 10 minute counter (43) and the 30 second counter (44) will stop counting and the engine disabler will be enabled (49). The 30 second counter will generate an arming signal when finishing counting 30 seconds (45). As a result, the 10 minute counter will stop counting (46) and the engine disabler will be enabled (49) in response to the arming signal. On the other hand, the 30 seconds counter will stop counting (48) and the engine disabler will be enabled (49) in response to the arming signal generated by the 10 minute timer when finishing 10 minute counting (47).

After the engine disabler is already enabled to prevent the engine from being started (49), only pressing button #1 of the remote control can turn off the engine disabler (50 & 51). After the engine disabler is turned off, the 10 minute counter will immediately start counting (52) and the door will be checked to see if any of the car's door is open (53). If there is a door opening, the procedure will go to step (29). Otherwise, the 30 second counter will start counting (54) and the procedure will go to step (36).

It is Known from the above that the present invention provides two ways of arming the vehicle security device—by remote control, and by timer.

By pressing the button #1 of the remote control, the vehicle security device will be armed immediately.

The vehicle security device has two separate counters—the 10 minute counter, and the 30 second counter. No matter doors are close or open, the 10 minute counter will start counting after turning off ignition and will continue counting even if a door is opened while the 30 second counter will start counting only if any opening door of the car is closed (provided all the remaining doors are close) and will stop counting either when any door of the car is opened or when ignition is turned on. The vehicle security device will arm itself if any one of the two counters finishes counting (whichever finishes first).

When the vehicle security device is already armed, the engine cannot be started and the vehicle security device will emit sound when there is any suspicious situation occurring inside the car. The two ways of arming the vehicle security device is designed for the consideration that if the owner turns off the engine and leaves the car for over ten minutes with a child or a pet in the car, the alarm function of the vehicle security device can be immune from the vibration caused by the child or the pet, and hence an abnormal sound emission can be avoided.

Figure 3:
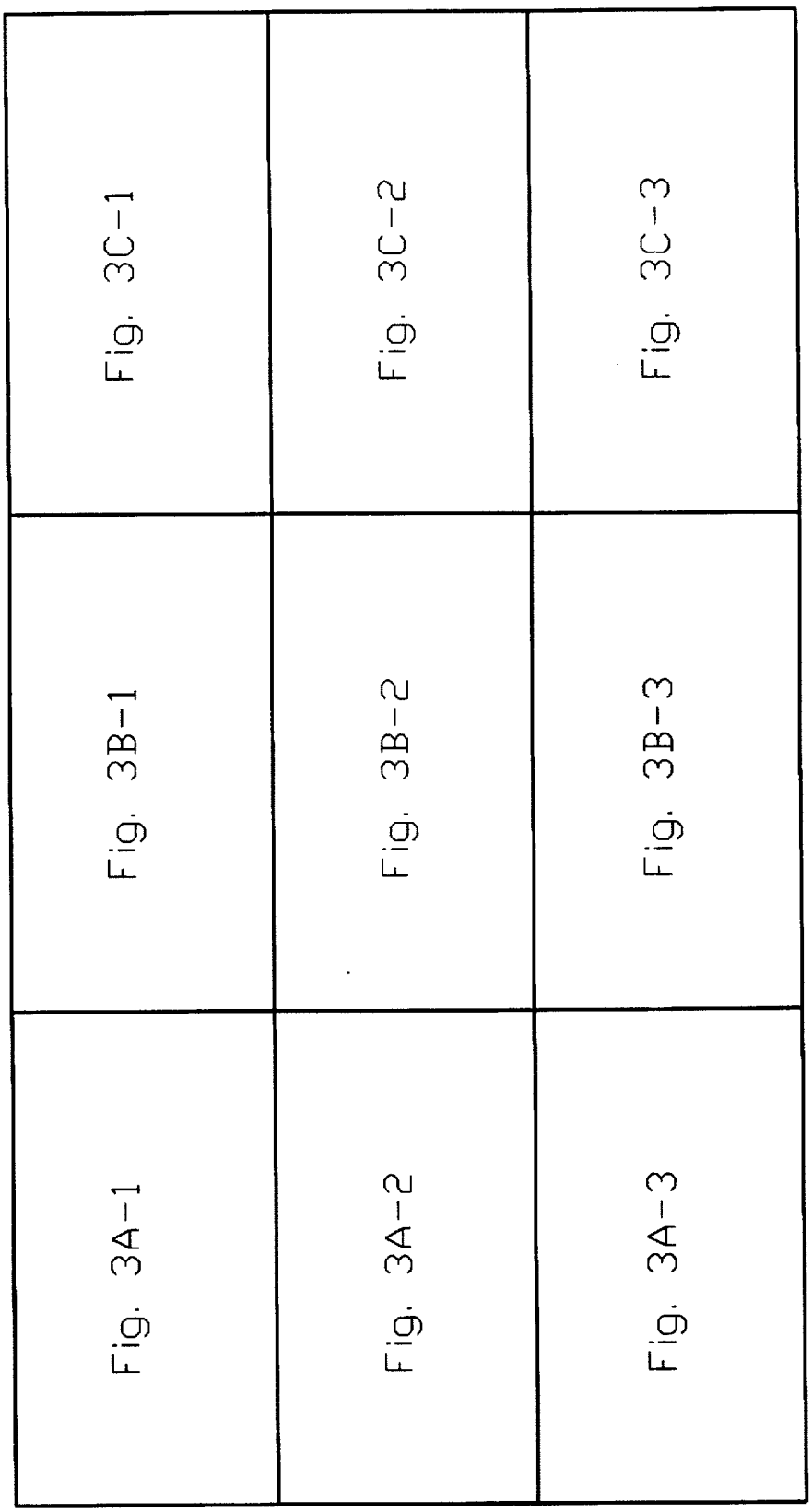
FIG. 3 is a key to FIGS. 3-1A through 3-3C of the present invention.
Figures 1, 3A:
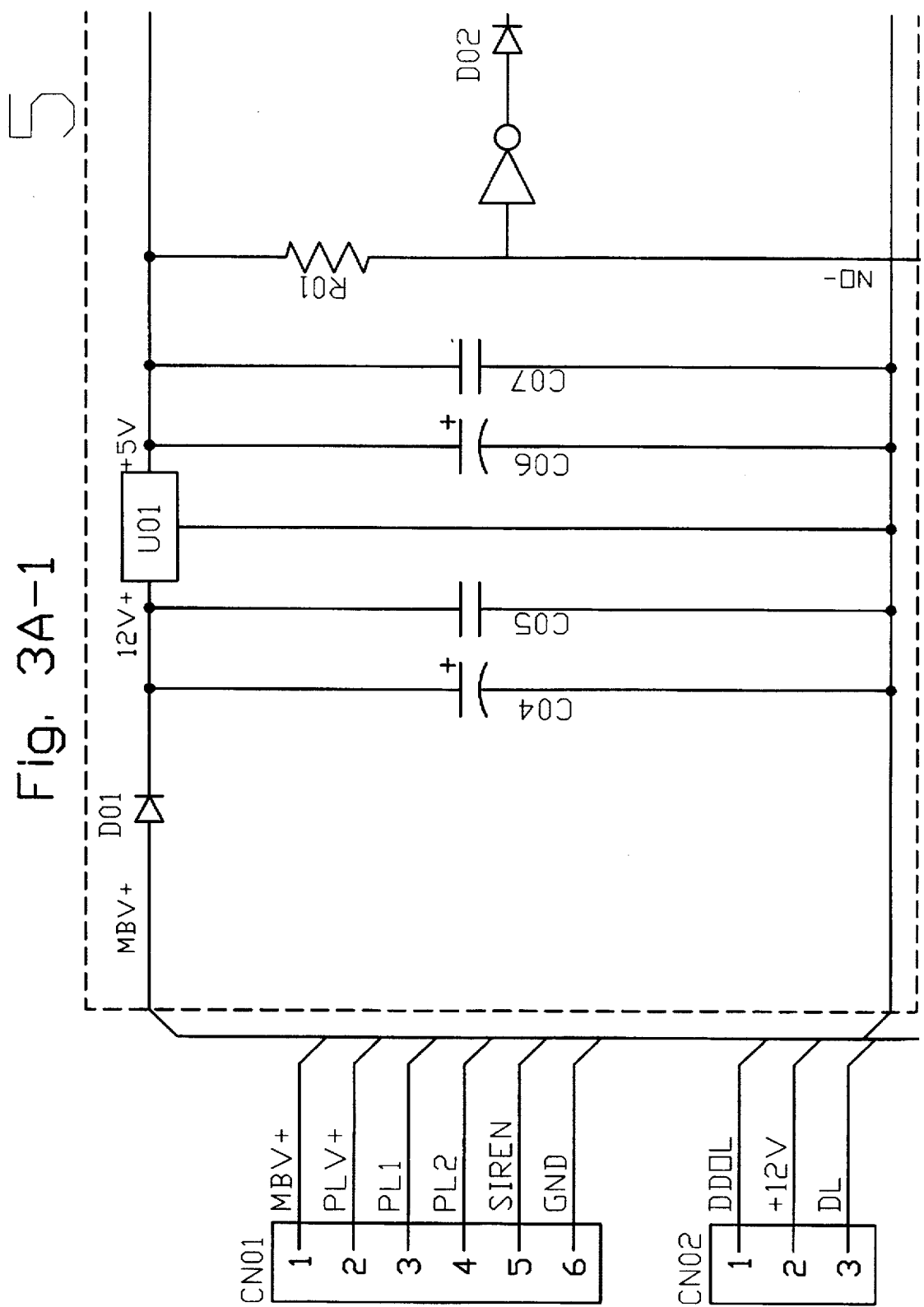

Please refer to FIG. 3. The box labeled 1 is the remote control unit for remote arming/disarming the alarm system. The box labeled 2 is the receiver/decoder section for receiving signals from the remote control and decode it for further processing in the central processing unit. The portion that is labeled 3 is the central processing unit which controls the whole operation of the present invention. The portion labeled 4 is the amplifier section used to amplify the control signal form the CPU to the output devices like parking lights, siren, etc. The portion labeled 5 is an ordinary voltage regulator circuit and input signal amplifier. The voltage regulator circuit is used to supply power to all parts of the circuit while the input signal amplifier is used to amplify signal form some input devices like doors.

Figures 2, 3A:
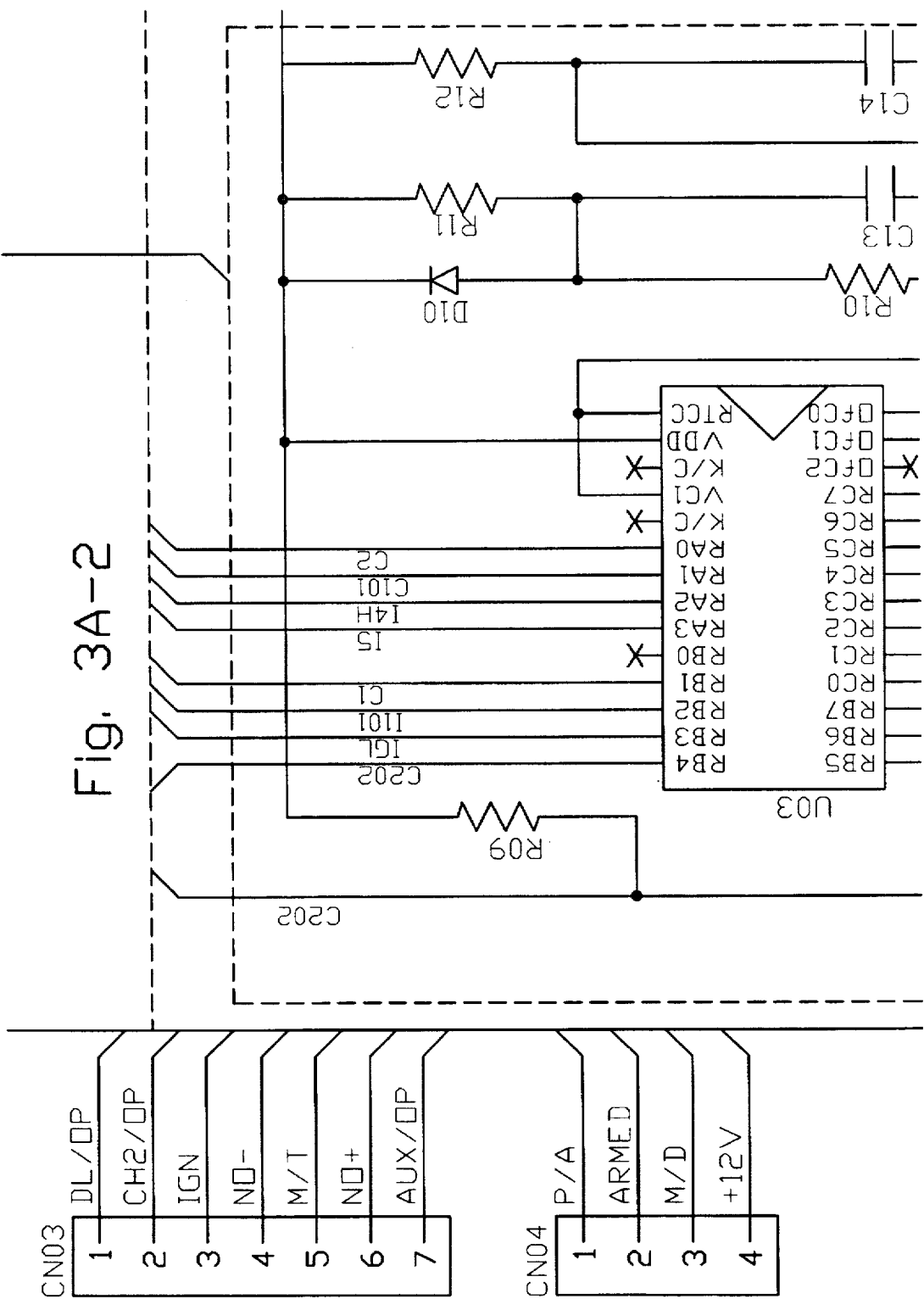
Figures 3, 3A:
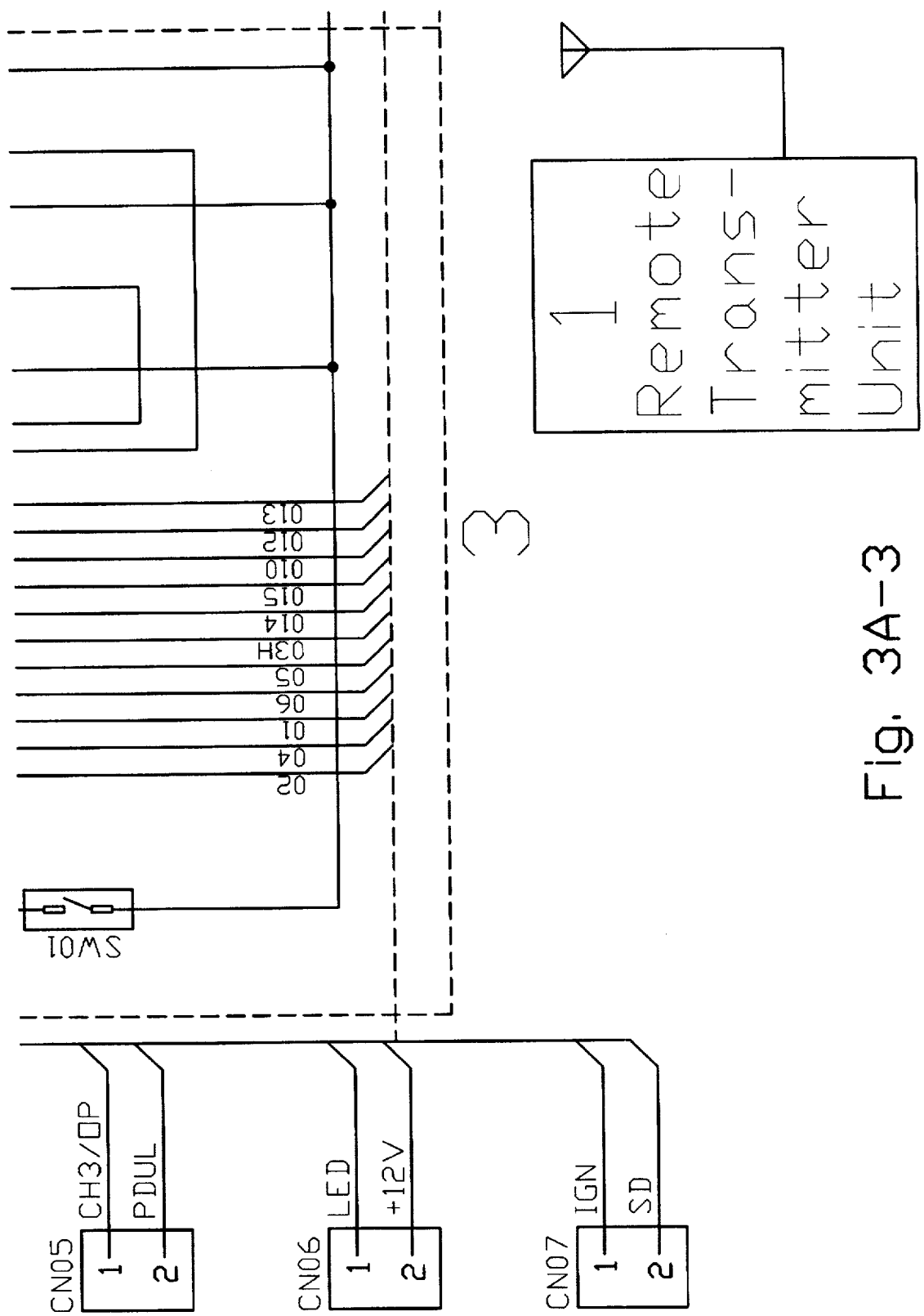
Figures 1, 3B:
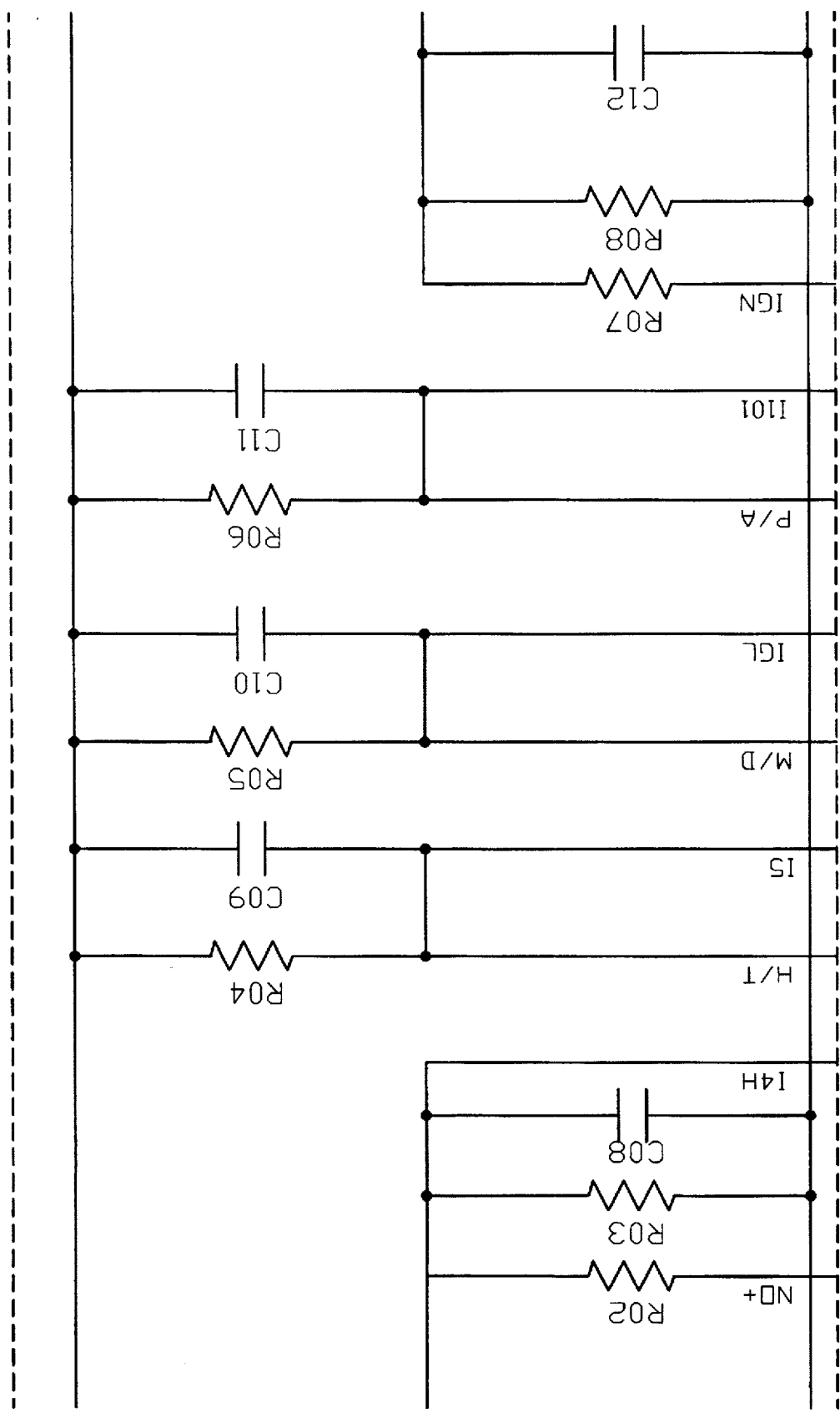
Figures 2, 3B:
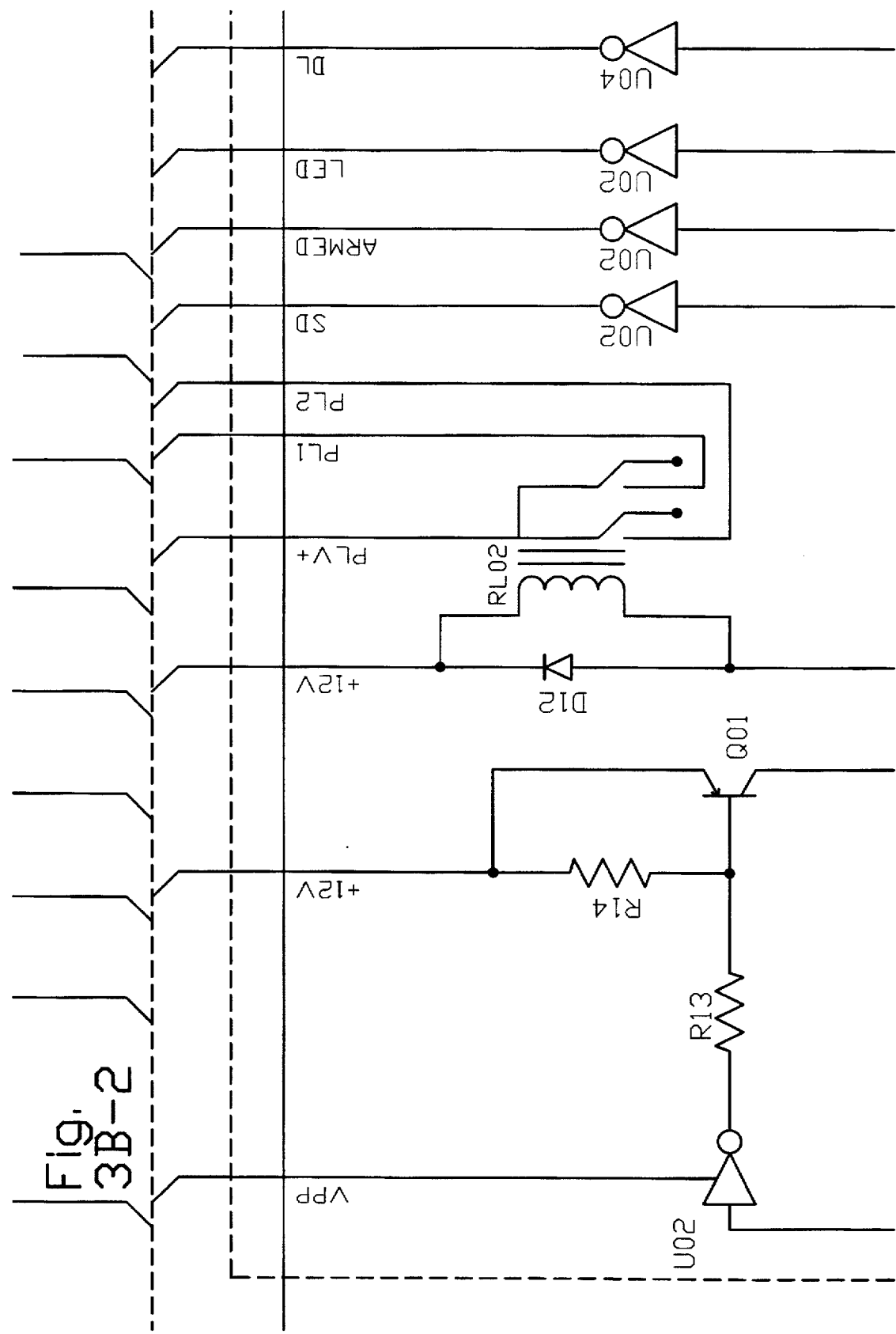
Figures 3, 3B:
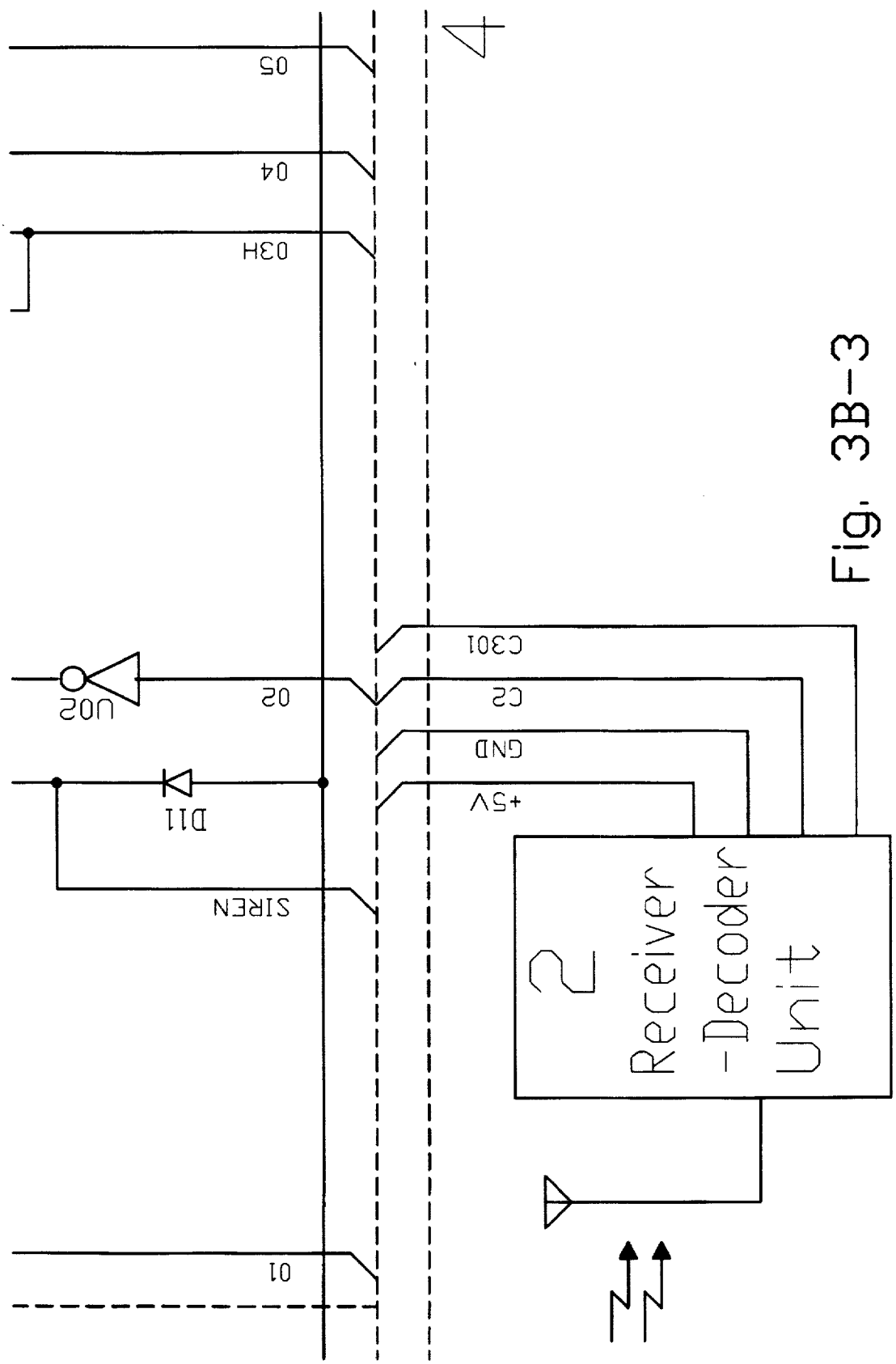
Figures 1, 3C:
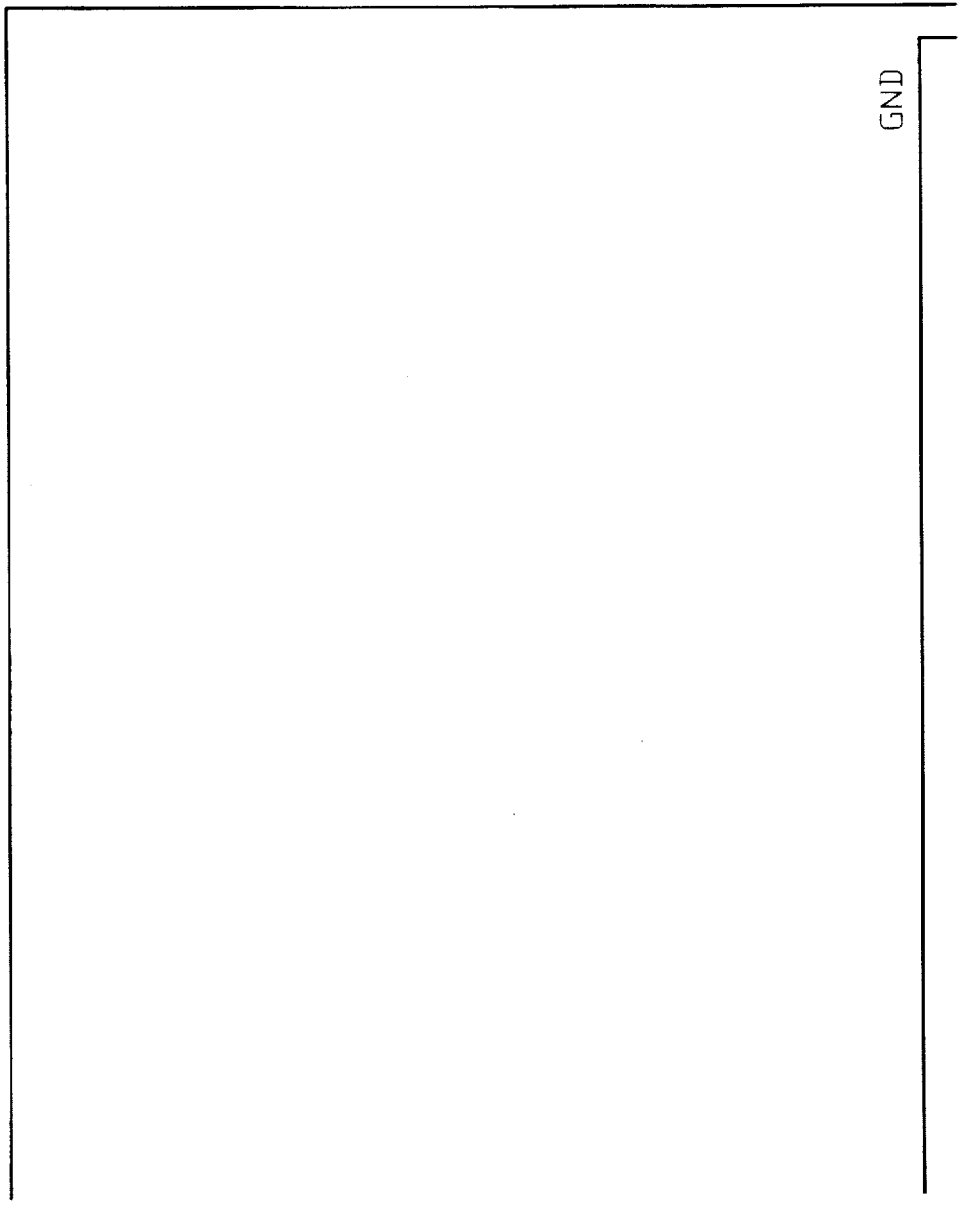
Figures 3, 3C:
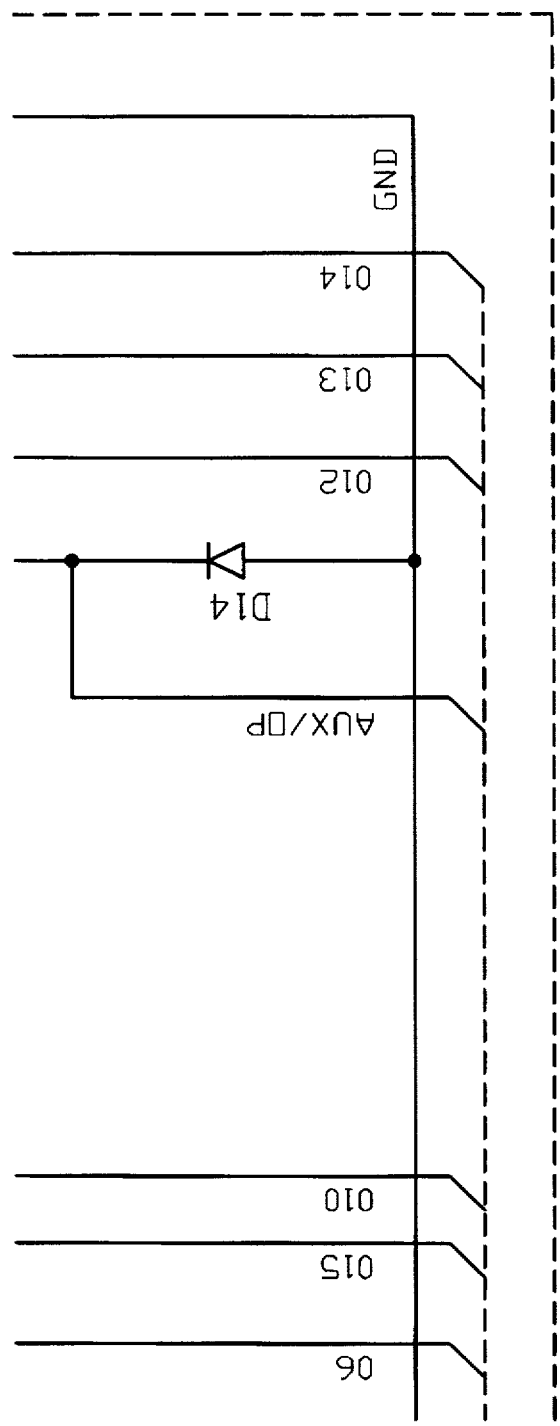

The circuit of the present invention includes a CPU U03 serving to control the operation procedure of the vehicle security device. The operation procedure of FIG. 2 is programmed in the CPU U03 for controlling the elements CN01 to CN07 of the car, including horn, car light, engine, etc. Two inverters U02 and U04 together form the buffer amplifying section for driving the above elements. The assembly of U01, D01, and C04 to C07 converts battery's 12 volts to 5 volts regulated power supply. The driving of switching of the parking lights PL1 and PL2 are controlled by a relay RL02. When the vehicle security device is armed, the CPU U03 continuously detects whether a signal is sent from the receiver/decoder section and whether the car is intruded by a thief. If the car is intruded by a thief and triggered the vehicle security device, and alarming sound will immediately be emitted and the parking light will continuously flash to scare the thief. At this time, the owner can press the remote control once to transmit a signal to the receiver/decoder section which then by means of C301 sends a signal to the CPU U03. The CPU U03 then shuts off the alarm and the parking light. Therefore, the present invention can be used in any types of cars to achieve full anti-burglar effect.

In conclusion, the vehicle security device of the present invention which includes a remote control, a receiver/decoder section, a CPU, and an amplifying section has been designed to arm in two ways—by remote control, and by timer.

By pressing the button #1 of the remote control, the vehicle security device will be armed immediately.

The vehicle security device has two separate counters—the 10 minute counter, and the 30 second counter. No matter doors are close or open, the 10 minute counter will start counting after turning off ignition and will continue counting regardless of the opening of any door, while the 30 second counter will start counting only if any opening door is closed (provided all the remaining doors are close), and will stop counting in response to the opening of any door of the car. The vehicle security device will arm itself if any of the two counters finishes counting (whichever finishes first). However, if the ignition is turned on during the counting, both the counter will stop counting and the car can be started.

The vehicle security device can only be disabled by pressing button #1 of the transmitter.

What is claimed is:

1. A vehicle security device comprising:

a remote unit for transmitting a control signal, a first timer that is activated when an ignition of a vehicle is turned off, said first timer generates an arming signal when said first timer is still in an activated state when a first preset time period has elapsed, a second timer that is activated when a door of said vehicle is closed, said second timer is deactivated when a closed door of said vehicle is opened, said second timer also generates an arming signal when said second timer is still in an activated state when a second preset time period has elapsed, means to disable an engine of said vehicle, said means is controlled by said remote unit or said first timer or said second timer, and a circuit for decoding said control signal to arm said security device and to deactivate said first and said second timers when said ignition is turned on, and to arm said security device when said arming signal is received from said first timer or when said arming signal is received from said second timer, whereby said security device is externally armed by said remote unit, or is automatically armed by said first timer and by said second timer.

2. The vehicle security device of claim 1 wherein:

said circuit further comprises means to decode said control signal to disarm said device.

3. The vehicle security device of claim 1 wherein:

said circuit further comprises a receiving circuit to receive and decode said control signal to output a generated arming signal, and said circuit further comprises a central processing unit to arm said device in response to said generated arming signal, and to deactivate said first and said second timers when said ignition is turned on.

* * * * *